US011224930B2

(12) United States Patent
Daniel

(10) Patent No.: US 11,224,930 B2
(45) Date of Patent: Jan. 18, 2022

(54) WELD SEQUENCER PART AND STATISTICAL LIMITS ANALYZER

(71) Applicant: Lincoln Global, Inc., City of Industry, CA (US)

(72) Inventor: Joseph A. Daniel, Sagamore Hills, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 407 days.

(21) Appl. No.: 16/286,461

(22) Filed: Feb. 26, 2019

(65) Prior Publication Data

US 2019/0193182 A1 Jun. 27, 2019

Related U.S. Application Data

(62) Division of application No. 15/014,965, filed on Feb. 3, 2016, now Pat. No. 10,576,570.

(60) Provisional application No. 62/273,205, filed on Dec. 30, 2015.

(51) Int. Cl.
| | |
|---|---|
| *B23K 9/095* | (2006.01) |
| *B23K 31/12* | (2006.01) |
| *G05B 19/18* | (2006.01) |
| *B23K 9/10* | (2006.01) |
| *B23K 9/12* | (2006.01) |

(52) U.S. Cl.
CPC .......... *B23K 9/0953* (2013.01); *B23K 9/1006* (2013.01); *B23K 9/12* (2013.01); *B23K 31/125* (2013.01); *G05B 19/18* (2013.01); *G05B 2219/37217* (2013.01); *G05B 2219/45135* (2013.01)

(58) Field of Classification Search
CPC .. B23K 31/125; B23K 9/0953; B23K 9/1006; B23K 9/12; G05B 19/18; G05B 2219/37217; G05B 2219/45135
USPC ... 219/130.5, 130.01, 130.21, 30.32, 130.31, 219/130.32, 130.33, 130.51, 137 PS; 700/28, 109, 110, 173, 174, 83, 108; 702/179, 180, 181, 86, 182–186
See application file for complete search history.

(56) References Cited

U.S. PATENT DOCUMENTS

| | | | |
|---|---|---|---|
| 4,996,409 A | | 2/1991 | Paton et al. |
| 5,061,841 A | * | 10/1991 | Richardson .......... B23K 9/0956 219/130.01 |
| 6,441,342 B1 | | 8/2002 | Hsu |

(Continued)

FOREIGN PATENT DOCUMENTS

DE 3545158 A1 6/1987

*Primary Examiner* — Dana Ross
*Assistant Examiner* — Ket D Dang

(57) ABSTRACT

Various systems and methods are provided that allow a weld sequencer to use a statistical analysis of generated reports to automatically determine weld parameter limits for the welds defined by various functions in a sequence file. For example, the weld sequencer can take reports generated for a specific type of part and statistically analyze the weld data included in the reports according to a set of analysis parameters provided by a user. The weld sequencer can use the statistical analysis to identify and remove outlier data and define a set of weld parameter limits based on the remaining data. The weld parameter limits can define a low limit and/or a high limit for one or more weld parameters associated with a function. The weld sequencer can then update the sequence file to include the weld parameter limits.

16 Claims, 8 Drawing Sheets

(56) References Cited

U.S. PATENT DOCUMENTS

| | | |
|---|---|---|
| 2002/0170899 A1 | 11/2002 | Suzuki |
| 2009/0173726 A1* | 7/2009 | Davidson ............. B23K 9/0956 219/130.01 |
| 2011/0114615 A1* | 5/2011 | Daniel ................... B23K 9/095 219/137 R |
| 2012/0205359 A1* | 8/2012 | Daniel ................ B23K 9/0953 219/130.01 |
| 2014/0042136 A1* | 2/2014 | Daniel ............... G05B 19/4183 219/130.5 |
| 2014/0042137 A1 | 2/2014 | Daniel et al. |

\* cited by examiner

SELECT CALCULATED DATA TO INCLUDE IN THE SEQUENCE FILE

SELECT FUNCTION DATA TO BE INCLUDED

| Include | Step | Function Type | Function Name | Parameter | Low Limit | High Limit | Samples | Average | SD | Comments |
|---|---|---|---|---|---|---|---|---|---|---|
| ☐ | 1 | Field_Entry | Field Entry | Estimated Time | | 05:44.7 | 3 of 3 | 01:33.0 | 02:05.8 | Not included |
| ☐ | 2 | Display_Picture | Display Picture | Estimated Time | | 00:21.1 | 3 of 3 | 00:07.0 | 00:07.0 | Not included |
| ☑ | 3 | Welding | Welding | Estimated Time | | 00:13.6 | 3 of 3 | 00:08.0 | 00:02.8 | |
| ☑ | 4 | Display_Picture | Display Picture | Estimated Time | | 00:02.0 | 3 of 3 | 00:02.0 | 00:00.0 | |
| ☑ | 5 | Welding | Welding | Estimated Time | | 00:06.9 | 3 of 3 | 00:05.5 | 00:00.7 | |

SELECT WELD VALIDATIONS TO BE INCLUDED

| Include | Step | Function Type | Function Name | Weld Validation | Low Limit | High Limit | Samples | Average | SD | Comments |
|---|---|---|---|---|---|---|---|---|---|---|
| ☑ | 3 | Welding | Welding | Arc Time | 00:01.4 | 00:01.4 | 4 of 4 | 00:01.4 | 00:00.0 | |
| ☑ | 3 | Welding | Welding | Arc Voltage | 13.8 | 36.7 | 4 of 4 | 25.2 | 3.8 | |
| ☐ | 3 | Welding | Welding | Arc Amperage | 42.7 | 93.7 | 4 of 4 | 68.2 | 8.5 | |
| ☐ | 3 | Welding | Welding | Wire Feed Speed | 110.5 | 156.5 | 4 of 4 | 133.5 | 7.7 | |
| ☐ | 3 | Welding | Welding | Deposition | 0.000702 | 0.000995 | 4 of 4 | 0.000848 | 0.000049 | |

FIG. 6

WELD SEQUENCER PART AND STATISTICAL LIMITS ANALYZER

CROSS-REFERENCE TO RELATED APPLICATIONS

This application is a divisional of U.S. patent application Ser. No. 15/014,965, filed on Feb. 3, 2016, which claims the benefit under 35 U.S.C. § 119(e) of U.S. Provisional Application No. 62/273,205, filed on Dec. 30, 2015, each of which is hereby incorporated by reference in its entirety.

TECHNICAL FIELD

Embodiments of the present disclosure relate to arc welding and the like. More particularly, certain embodiments of the present disclosure relate to systems and methods for generating and editing welding sequences to be used by a welding job sequencer.

BACKGROUND

Generally, work cells are used to produce welds or welded parts. There are at least two broad categories of work cells, including robotic work cells and semi-automatic work cells. In robotic work cells, the scheduling and performing of welding operations is largely automated, with little operator involvement. Thus, these cells generally have a relatively low labor cost and a relatively high productivity. However, their repeating operations cannot easily adapt to varying welding conditions and/or sequences.

In contrast, semi-automatic work cells (e.g., work cells involving at least some operator welding) generally provide less automation as compared to robotic work cells and, accordingly, have a relatively higher labor cost and a relatively lower productivity. Nevertheless, there are many instances where using a semi-automatic welding work cell can actually be advantageous over robotic work cells. For example, a semi-automatic welding work cell can more easily adapt to varying welding conditions and/or sequences.

SUMMARY

The systems, methods, and devices described herein each have several aspects, no single one of which is solely responsible for its desirable attributes. Without limiting the scope of this disclosure, several non-limiting features will now be discussed briefly.

The systems and methods disclosed herein provide a report analysis function within a weld sequencer that allows the weld sequencer to use a statistical analysis of generated reports to automatically determine weld parameter limits for the welds defined by various functions. For example, the weld sequencer can take reports generated for a specific type of part and statistically analyze the weld data included in the reports according to a set of analysis parameter values provided by a user or operator. The weld sequencer can use the statistical analysis to identify and remove outlier data (e.g., flawed data) and define a set of weld parameter limits based on the remaining data. The weld parameter limits can define a low limit and/or a high limit for one or more weld parameters associated with a function. The weld sequencer can then update the sequence file to include the weld parameter limits. Thus, the next time an operator runs the sequence file to weld the specific type of part, the weld sequencer can use values of weld parameters captured during a welding operation along with the weld parameter limits to automatically determine whether the weld is valid or invalid. If the weld is invalid, an alert and/or notification can be generated and displayed on a screen for viewing by the operator.

One aspect of the disclosure provides a weld sequencer system. The weld sequencer system comprises a welding power source configured to provide power to an implement to perform a welding operation on a plurality of parts; and a welding sequencer coupled to the welding power source, the welding sequencer configured to, for each part in the plurality of parts: store weld data associated with the performance of the welding operation, where the weld data comprises a value for a weld parameter. The welding sequencer is further configured to: retrieve a sequence file associated with the plurality of parts, retrieve the weld data for each part in the plurality of parts, select a set of constraints for the weld parameter, and perform a statistical analysis on the values of the weld parameter to define a set of weld parameter limits for the weld parameter.

The weld sequencer system of the preceding paragraph can have any sub-combination of the following features: where the welding sequencer is further configured to, for reach part in the plurality of parts, set one or more parameters of the welding power source based on the sequence file associated with the plurality of parts so that the welding operation can be performed; where the welding sequencer is further configured to automatically modify the sequence file to include the set of weld parameter limits in response to performing the statistical analysis; where the sequence file comprises a first function corresponding to the welding operation and a second function corresponding to a second welding operation, and where the first function is associated with a first identifier and the second function is associated with a second identifier; where the weld data for each part in the plurality of parts is associated with the first identifier, and where the welding sequencer is further configured to: identify that the first function is associated with the first identifier, and automatically modify the first function in the sequence file to include the set of weld parameter limits based on the identification; where the weld parameter includes at least one of a current level, a voltage level, a wire feed speed, a weld time, and a weld operation total time; where the set of constraints comprises a number of standard deviations below a mean weld parameter value and a number of standard deviations above the mean weld parameter value; where the welding sequencer is further configured to remove values of the weld parameter that are below a value corresponding to the number of standard deviations below the mean weld parameter value or that are above a value corresponding to the number of standard deviations above the mean weld parameter value; where the set of constraints further comprises a first coefficient of variance, and where the welding sequencer is further configured to generate an alert if remaining values of the weld parameter result in a coefficient of variance greater than the first coefficient of variance; and where the set of constraints further comprises a second number of standard deviations below the mean weld parameter value and a third number of standard deviations above the mean weld parameter value, and where the welding sequencer is further configured to define the set of weld parameter limits for the weld parameter based on a mean of the remaining values of the weld parameter, the second number of standard deviations below the mean weld parameter value, and the third number of standard deviations above the mean weld parameter value.

Another aspect of the disclosure provides a method of analyzing welding operations. The method comprises storing, for each part in a plurality of parts, weld data associated with the performance of a welding operation by a welding power source, where the weld data comprises a value for a weld parameter; selecting a set of constraints for the weld parameter; and performing a statistical analysis on the values of the weld parameter to define a set of weld parameter limits for the weld parameter.

The method of the preceding paragraph can have any sub-combination of the following features: where the method further comprises setting, for each part in a plurality of parts, one or more parameters of the welding power source based on a sequence file associated with the plurality of parts so that the welding power source can perform a welding operation; where the method further comprises automatically modifying a sequence file associated with the plurality of parts to include the set of weld parameter limits in response to performing the statistical analysis; where the sequence file comprises a first function corresponding to the welding operation and a second function corresponding to a second welding operation, and where the first function is associated with a first identifier and the second function is associated with a second identifier; where the weld data for each part in the plurality of parts is associated with the first identifier, and where automatically modifying the sequence file further comprises: identifying that the first function is associated with the first identifier, and automatically modifying the first function in the sequence file to include the set of weld parameter limits based on the identification; where the set of constraints comprises a number of standard deviations below a mean weld parameter value and a number of standard deviations above the mean weld parameter value; where the method further comprises removing values of the weld parameter that are below a value corresponding to the number of standard deviations below the mean weld parameter value or that are above a value corresponding to the number of standard deviations above the mean weld parameter value; where the set of constraints further comprises a first coefficient of variance, and where the method further comprises generating an alert if remaining values of the weld parameter result in a coefficient of variance greater than the first coefficient of variance; and where the set of constraints further comprises a second number of standard deviations below the mean weld parameter value and a third number of standard deviations above the mean weld parameter value, and where the method further comprises defining the set of weld parameter limits for the weld parameter based on a mean of the remaining values of the weld parameter, the second number of standard deviations below the mean weld parameter value, and the third number of standard deviations above the mean weld parameter value.

BRIEF DESCRIPTION OF THE DRAWINGS

FIG. 6 illustrates a user interface depicting the selection of weld parameter limits to include in a sequence file.

DETAILED DESCRIPTION OF SPECIFIC EMBODIMENTS

Overview

Figure 1:
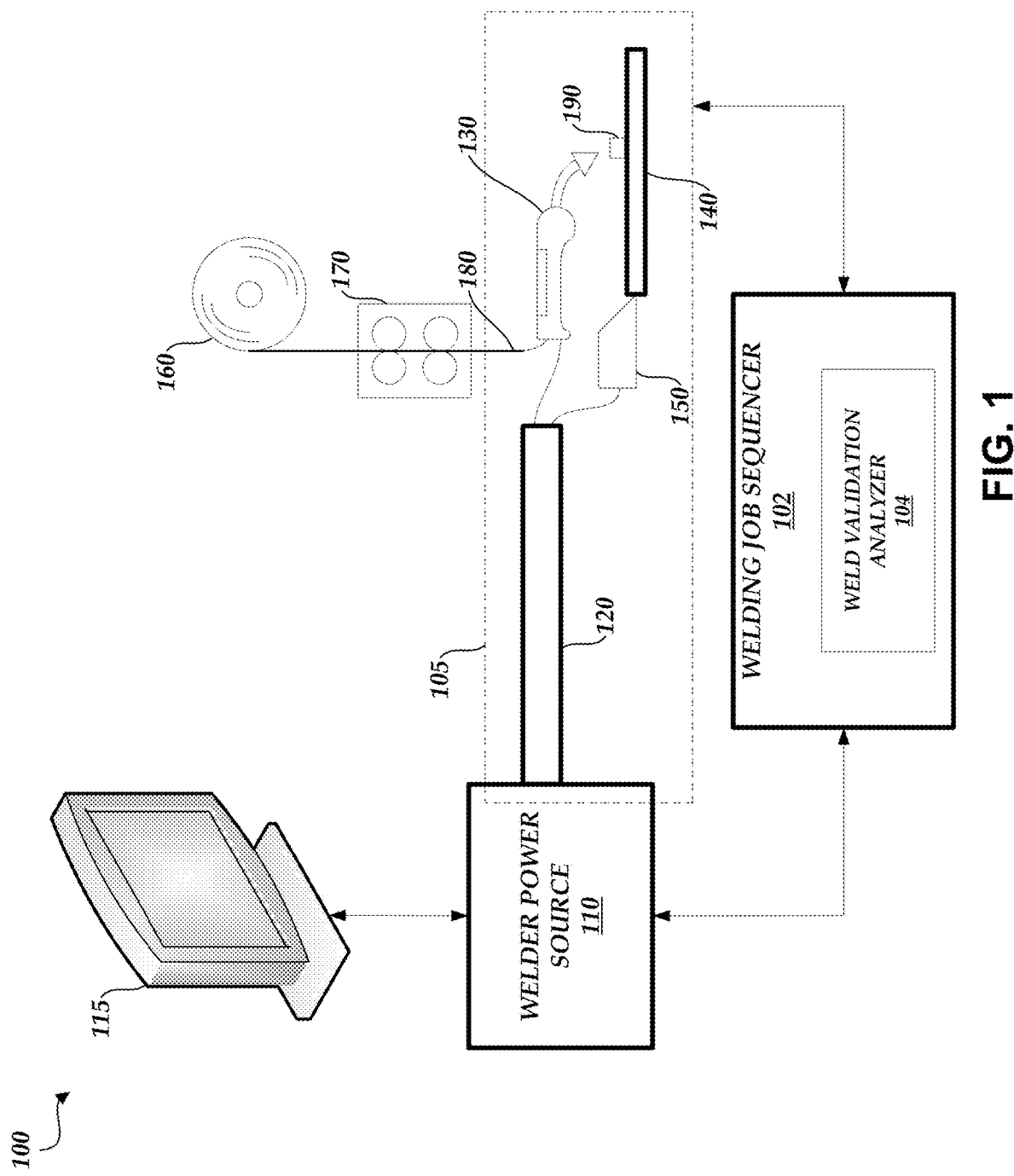
FIG. 1 illustrates a block diagram of a welding system that utilizes a welding job sequencer.

As described above, robotic work cells and semi-automatic work cells are two broad categories of work cells. In typical semi-automatic work cells, parts are welded according to a welding schedule. The welding schedule can be stored in an electronic form, such as a sequence file, and the sequence file can include functions that represent each step in the welding schedule. For example, a function can include parameter settings for the semi-automatic equipment and visual representations of a weld to be performed and/or the location of the weld on a part.

A computer system, such as a weld sequencer, can execute the sequence file. When executed, an operator can step through the functions in an order determined by the welding schedule. When a function is reached, the weld sequencer can automatically adjust the parameter settings of the semi-automatic equipment to the parameter settings corresponding to the function and display visual representations of the weld corresponding to the function, and the operator can complete the weld.

Unfortunately, because semi-automatic work cells involve at least some operator welding, human error can occur, resulting in suboptimal welds. In some cases, it may be difficult to detect a suboptimal weld just from a visual inspection of the weld. Thus, the weld sequencer generates reports that provide details on every function and every weld of a specific part. A separate report can be generated for each individual part, even if one part is the same type of part as another. A rework operator (e.g., an operator tasked with reworking or fixing faulty welds) can review the information provided in the reports to calculate proper weld parameter limits that can be used to determine whether a weld is valid or not. However, such review can be cumbersome and lengthy given the large amount of data stored in the reports (and the possibly large number of reports). Furthermore, some of the data in the reports can be flawed (e.g., the operator did not follow or fully complete the welding schedule, the operator used improper equipment, etc.) and should not be included in the review, but the rework operator has no way of identifying such flawed data. Because of this, rework operators often estimate weld parameter limits that end up being too strict (e.g., creating nuisance errors) or too open (e.g., allowing faulty welds to pass inspection without any rework).

Accordingly, the systems and methods disclosed herein provide a report analysis function within the weld sequencer that allows the weld sequencer to use a statistical analysis of the generated reports to automatically determine weld parameter limits for the welds defined by the various functions. For example, the weld sequencer can take reports generated for a specific type of part and statistically analyze the weld data included in the reports according to a set of analysis parameter values provided by a user or operator. The weld sequencer can use the statistical analysis to identify and remove outlier data (e.g., flawed data) and define a set of weld parameter limits based on the remaining data. The weld parameter limits can define a low limit and/or a high limit for one or more weld parameters associated with a function. The weld sequencer can then update the sequence file to include the weld parameter limits. Thus, the next time an operator runs the sequence file to weld the specific type of part, the weld sequencer can use values of weld parameters captured during a welding operation along with the weld parameter limits to automatically determine whether the weld is valid or invalid. If invalid, an alert and/or notification can be generated and displayed on a screen for viewing by the operator.

Weld Sequencer Overview

FIG. 1 illustrates a block diagram of a welding system 100 that utilizes a welding job sequencer 102. As used herein, the welding system 100 is also referred to as a welding work cell, where the welding work cell and/or the welding system 100 can produce welds or welded parts. As illustrated in FIG. 1, the welding system 100 includes the welding job sequencer 102, a welding circuit path 105, a welder power source 110, and a display 115 operationally coupled to the welder power source 110 (and/or the welding job sequencer 102). Alternatively, the display 115 may be an integral part of the welder power source 110. For example, the display 115 can be incorporated into the welder power source 110, a stand-alone component (as depicted), or a combination thereof.

The welding system 100 further includes a welding cable 120, a welding tool 130, a workpiece connector 150, a spool of wire 160, a wire feeder 170, and a wire 180. In further embodiments, the welding system 100 further includes a workpiece 140 and a part 190. In embodiment, the wire 180 is fed into the welding tool 130 from the spool 160 via the wire feeder 170. In another embodiment, the welding system 100 does not include the spool of wire 160, the wire feeder 170, and/or the wire 180. Instead, the welding system 100 includes a welding tool comprising a consumable electrode, such as used in, for example, stick welding. In accordance with various embodiments disclosed herein, the welding tool 130 includes at least one of a welding torch, a welding gun, or a welding consumable, for example, but without limitation.

The welding circuit path 105 can run from the welder power source 110 through the welding cable 120 to the welding tool 130, through the workpiece 140 and/or to the workpiece connector 150, and back through the welding cable 120 to the welder power source 110. During operation, electrical current runs through the welding circuit path 105 as a voltage is applied to the welding circuit path 105. In an embodiment, the welding cable 120 comprises a coaxial cable assembly. In another embodiment, the welding cable 120 comprises a first cable length running from the welder power source 110 to the welding tool 130, and a second cable length running from the workpiece connector 150 to the welder power source 110. The welding circuit path 105 can be used by the welding power source 110 to collect weld data (e.g., weld parameter values) as a weld is performed. This information can be forwarded to the welding job sequencer 102 for inclusion in one or more reports.

The welding job sequencer 102 can configure welding equipment (e.g., the welding tool 130) for two or more weld operations to assemble a workpiece (e.g., the workpiece 140). The welding job sequencer 102 is configured to implement a welding sequence defined by a sequence file that includes settings, configurations, and/or parameters to perform two or more welding procedures on the workpiece. In particular, the welding job sequencer 102 can automatically configure the welding equipment to create two or more welds, as described above. Moreover, the welding job sequencer 102 can utilize the welding sequence (e.g., the visual representations of the welds) to help an operator perform the two or more welds. The welding job sequencer 102 can be utilized with a semi-automatic work cell, such as the welding system 100. However, it is to be appreciated and understood that the welding job sequencer 102 can be implemented in a suitable welding environment or system that includes at least welding equipment and an operator to facilitate creating one or more welds.

In an embodiment, the welding job sequencer 102 includes a weld validation analyzer 104. The weld validation analyzer 104 can open a sequence file, take reports generated for a specific type of part, and statistically analyze the weld data included in the reports according to a set of analysis parameter values provided by a user or operator. The weld validation analyzer 104 can use the statistical analysis to identify and remove outlier data (e.g., flawed data) and define a set of weld parameter limits based on the remaining data. The weld parameter limits can define a low limit and/or a high limit for one or more weld parameters associated with a function in the sequence file. The weld validation analyzer 104 can then update the sequence file to include the weld parameter limits. Thus, the next time an operator welds the specific type of part, the welding job sequencer 102 can open the updated sequence file and use values of weld data (e.g., values of weld parameters) captured by the welding power source 110 during a welding operation along with the weld parameter limits to automatically determine whether the weld is valid or invalid. If invalid, the welding job sequencer 102 can generate an alert and/or notification and/or cause the display 115 to display the alert and/or notification for viewing by the operator. The functions performed by the weld validation analyzer 104 are described in greater detail below with respect to FIGS. 2-7.

It is also to be appreciated that the welding job sequencer 102 can be a stand-alone component (as depicted), can be incorporated into another component of the welding work cell, or a suitable combination thereof. Additionally, the welding job sequencer 102 can be a distributed system, software-as-a-service (SaaS), a cloud-based system, or a combination thereof. The welding job sequencer 102 can include one or more processors that are used to execute stored program instructions, such as instructions provided by a sequence file, and otherwise perform the operations described herein.

In an embodiment, the welding job sequencer 102 is configured to interact with a portion of the welding system 100. For example, the welding job sequencer 102 can interact with at least the welder power source 110, at least a portion of the welding circuit path 105, the spool of wire 160, the wire feeder 170, or a combination thereof. The welding job sequencer 102 automatically adjusts one or more elements of the welding system 100 based on a welding sequence (e.g., the functions in the sequence file), where the welding sequence is utilized to configure the welding system 100 (or an element thereof) without operator intervention in order to perform two or more welding procedures with respective settings or configurations for each welding procedure.

In an embodiment, the welding job sequencer 102 employs a welding sequence (e.g., the parameter settings associated with each function in the sequence file) to automatically configure welding equipment. It is to be appreciated that the welding system 100 or a welding work cell can employ a plurality of welding sequences for the assembly of one or more workpieces. For example, a workpiece can include three welds to complete the assembly in which a first welding sequence can be used for the first weld, a second welding sequence can be used for the second weld, and a third welding sequence can be used for the third weld.

Moreover, in such an example, the entire assembly of the workpiece, including the three welds, can be referenced as a welding sequence. In an embodiment, a welding sequence that includes specific configurations or steps can further be included within a disparate welding sequence (e.g., nested welding sequence). A nested welding sequence can be a welding sequence that includes a welding sequence as part of the procedure. Moreover, the welding sequence can include at least one of a parameter, a welding schedule, a portion of a welding schedule, a step-by-step instruction, a portion of media (e.g., images, video, text, and the like), or a tutorial, among others. In general, the welding sequence can be created and employed in order to guide an operator through welding procedure(s) for specific workpieces without the operator manually setting welding equipment to perform such welding procedures.

One or more welder power source(s) 110 aggregate data respective to a respective welding process to which the welder power source 110 is providing power to implement. Such collected data relates to each welder power source 110 and is herein referred to as "weld data." Weld data can include weld parameters and/or information specific to the particular welding process to which the welder power source 110 is supplying power. For example, weld data can be an output (e.g., a waveform, a signature, a voltage, a current, among others), a weld time, a power consumption, a weld parameter for a welding process, a welder power source 110 output for the welding process, and/or the like. In an embodiment, weld data can be utilized with the welding job sequencer 102. For example, weld data can be set by the functions corresponding to the steps of a welding sequence. In another example, weld data can be used as a feedback or a feedforward loop to verify settings.

In an embodiment, the welding job sequencer 102 is a computer operable component that can execute the methodologies and processes disclosed herein. In order to provide additional context for various aspects of embodiments disclosed herein, the following discussion is intended to provide a brief, general description of a suitable computing environment in which the various aspects of embodiments disclosed herein may be implemented. While embodiments have been described above in the general context of computer-executable instructions that may run on one or more computers, those skilled in the art will recognize that embodiments also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the methods disclosed herein may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For example, a remote database, a local database, a cloud-computing platform, a cloud database, or a combination thereof can be utilized with the welding job sequencer 102.

The welding job sequencer 102 can utilize an exemplary environment for implementing various aspects of the embodiments disclosed herein, including a computer, where the computer includes a processing unit, a system memory and a system bus. The system bus couples system components, including, but not limited to, the system memory to the processing unit. The processing unit may be any of various commercially available processors. Dual microprocessors and other multi-processor architectures also can be employed as the processing unit.

The system bus can be any of several types of bus structures, including a memory bus or memory controller, a peripheral bus, and/or a local bus using any of a variety of commercially available bus architectures. The system memory can include read only memory (ROM) and random access memory (RAM). A basic input/output system (BIOS), including the basic routines that help to transfer information between elements within the welding job sequencer 102, such as during start-up and/or when statistically analyzing reports, is stored in the ROM.

The welding job sequencer 102 can further include a hard disk drive, a magnetic disk drive (e.g., to read from or write to a removable disk), and/or an optical disk drive (e.g., for reading a CD-ROM disk or to read from or write to other optical media). The welding job sequencer 102 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the welding job sequencer 102.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in the welding job sequencer 102 can be any of a number of commercially available operating systems.

In addition, a user may enter commands and information (e.g., weld analysis parameters) into one or more components of the welding system 100 through a keyboard and/or a pointing device, such as a mouse. Other input devices may include a microphone, an IR remote control, a track ball, a pen input device, a joystick, a game pad, a digitizing tablet, a satellite dish, a scanner, and/or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., the display 115), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition to or in combination with the display 115) can be employed with the welding job sequencer 102 to present data that is electronically received from the processing unit (e.g., an alert and/or notification if a weld is faulty or invalid). For example, the display can be an LCD, plasma, CRT, etc. monitor that presents data electronically. Alternatively or in addition, the display can present received data in a hard copy format such as a printer, facsimile, plotter etc. The display can present data in any color and can receive data from the welding job sequencer 102 via any wireless or hard wire protocol and/or standard. In another example, the welding job sequencer 102 and/or the welding system 100 can be utilized with a mobile device, such as a cellular phone, a smart phone, a tablet, a portable gaming device, a portable Internet browsing device, a Wi-Fi device, or a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, external, among others) computing platform can be utilized for data aggregation, processing, and delivery. For this purpose, the cloud computing platform can include a plurality of processors, memory, and servers in a particular remote location. Under a software-as-a-service (SaaS) paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

Statistical Analysis of Weld Data

As described above, an operator can weld a specific type of part using a sequence file executed by the welding job sequencer 102. Initially, the sequence file may include functions that define each step in a welding sequence, but the sequence file may not include any validation information (e.g., weld parameter limits that define whether a weld is valid or invalid). As one or more operators use the sequence file to assemble individual parts via one or more welds, the welding job sequencer 102 can generate reports using the weld data provided by the welder power source 110 via the welding cable 120. Each report can be associated with the assembly of an individual part.

After one or more reports are generated, a user or operator can request the weld validation analyzer 104 to generate validation information for inclusion in the sequence file. As described herein, each function in the sequence file can be associated with a unique identifier. Thus, the welding job sequencer 102 can associate the unique identifier of a function being completed by the operator with the weld data that is collected as a result of completion of the function. The weld validation analyzer 104 can then statistically analyze the weld data by unique identifier, and any generated validation information can be associated with the unique identifier from which the validation information results. Accordingly, the weld validation analyzer 104 can associate each function in the sequence file with validation information specific to the respective function.

Thus, once the sequence file is updated to include the validation information, an operator can begin assembly of a new part. As the operator completes a function, the validation information specific to the completed function can be used to analyze the obtained weld data. If the validation information indicates that at least a portion of the weld data does not meet the constraints defined by the validation information, then the welding job sequencer 102 can generate an alert and/or notification for display to the operator. In an embodiment, the sequence file is periodically updated with updated validation information as additional parts are assembled.

To begin the process of updating the sequence file to include validation information, a user or operator can be presented with a series of user interfaces generated by, for example, the welding job sequencer 102 for display on a display of the welding job sequencer 102 and/or the display 115. First, the user or operator selects a sequence file to update. Then, the user interfaces can guide the user or operator through the process of generating the validation information and are described below with respect to FIGS. 2-6.

Figure 2:
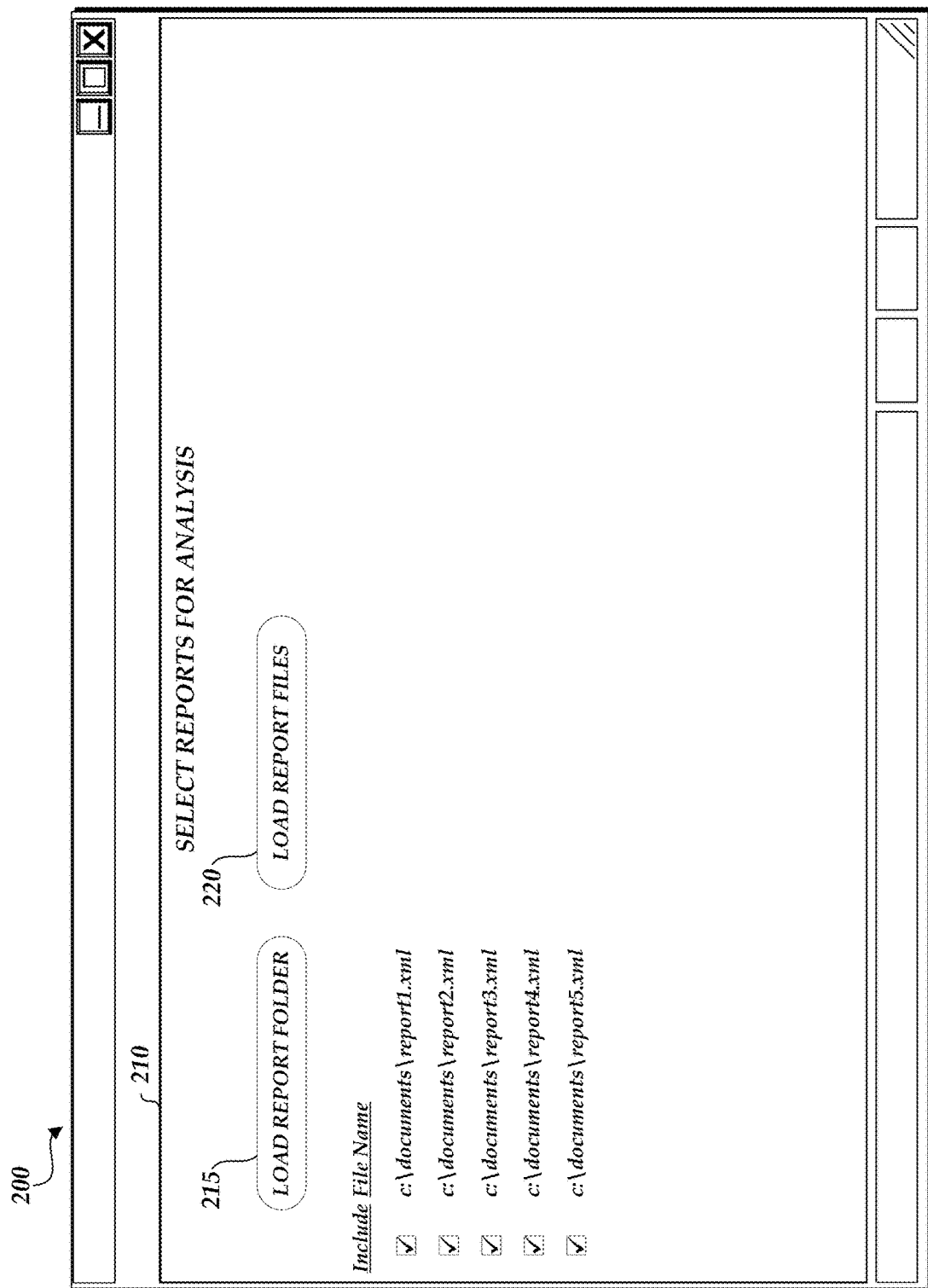
FIG. 2 illustrates a user interface depicting the selection of one or more reports.

FIG. 2 illustrates a user interface 200 depicting the selection of one or more reports. As illustrated in FIG. 2, the user interface 200 includes a window 210. The window 210 includes a load report folder button 215 and a load report files button 220. Selecting either button 215 or 220 can cause the user interface 200 to display a window that allows the user or operator to select individual reports or a folder of reports (e.g., reports stored on a local file system).

For example, the user interface 200 displays 5 reports. While only 5 reports are depicted, this is merely for illustrative purposes. Any number of reports can be displayed within the user interface 200. While the weld validation analyzer 104 generates validation information for a specific type of part, it may not be necessary for the user or operator to only select reports associated with the specific type of part. Rather, the user or operator can select any report, regardless of the type of part for which the report was generated. The user interface 200 can autoselect one or more reports and the user or operator may change the default selections. Here, the user or operator has selected all of the listed reports.

Figure 3:
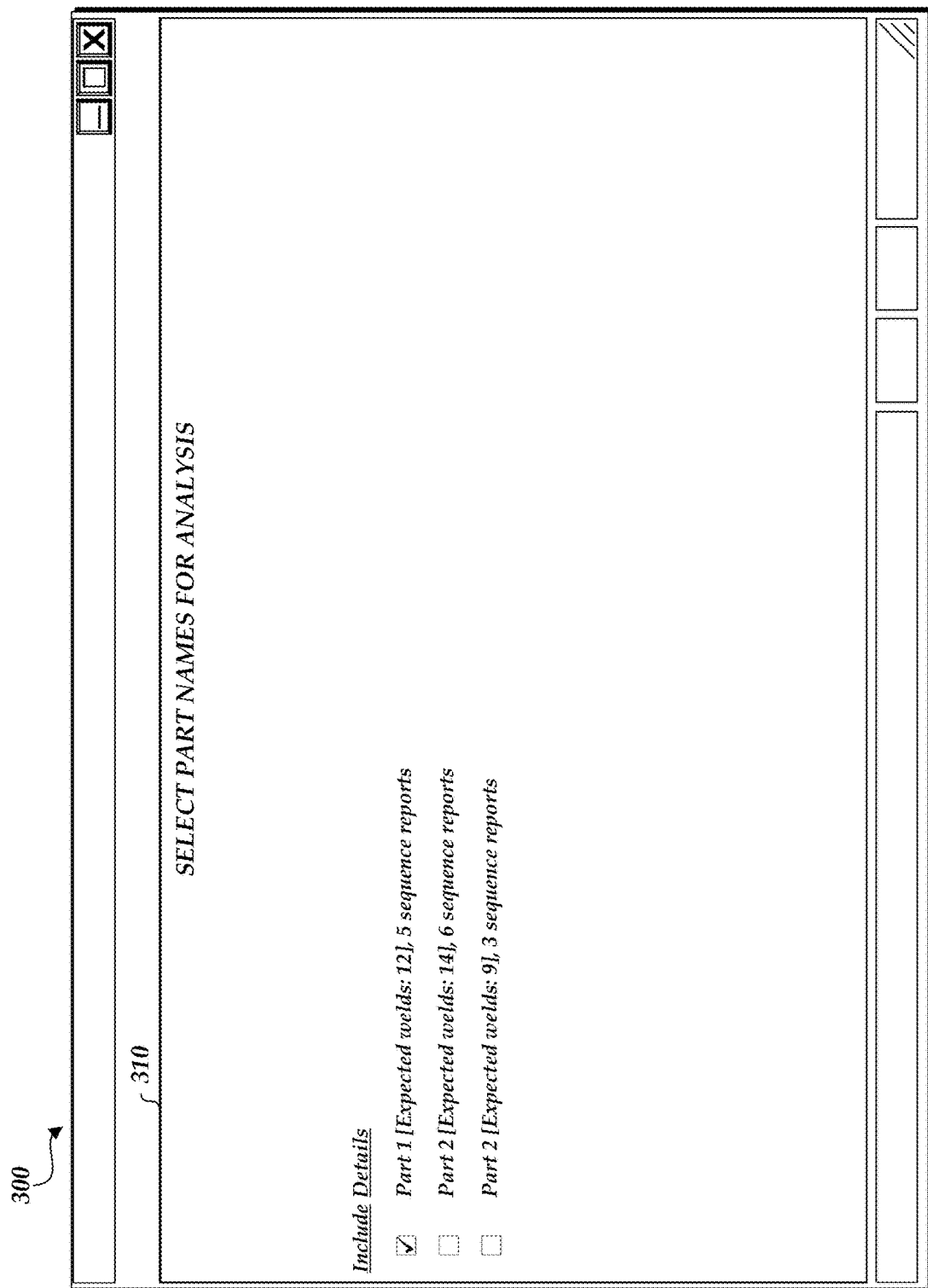
FIG. 3 illustrates a user interface depicting the selection of a specific type of part.

FIG. 3 illustrates a user interface 300 depicting the selection of a specific type of part. In an embodiment, once the report(s) are selected, the weld validation analyzer 104 parses the reports and determines which parts each of the reports is associated with. All identified parts are then displayed to the user or operator, as illustrated in FIG. 3 in window 310.

The user interface 300 provides additional details regarding each identified part. For example, the user interface 300 identifies, for each identified part, the part name, a number of welds that are expected to assemble the respective part, and the number of sequence reports that were parsed and that are associated with the respective part. The user interface 300 can autoselect one part. However, the user or operator may change the default selection. Here, the user or operator has selected Part 1.

Figure 4A:
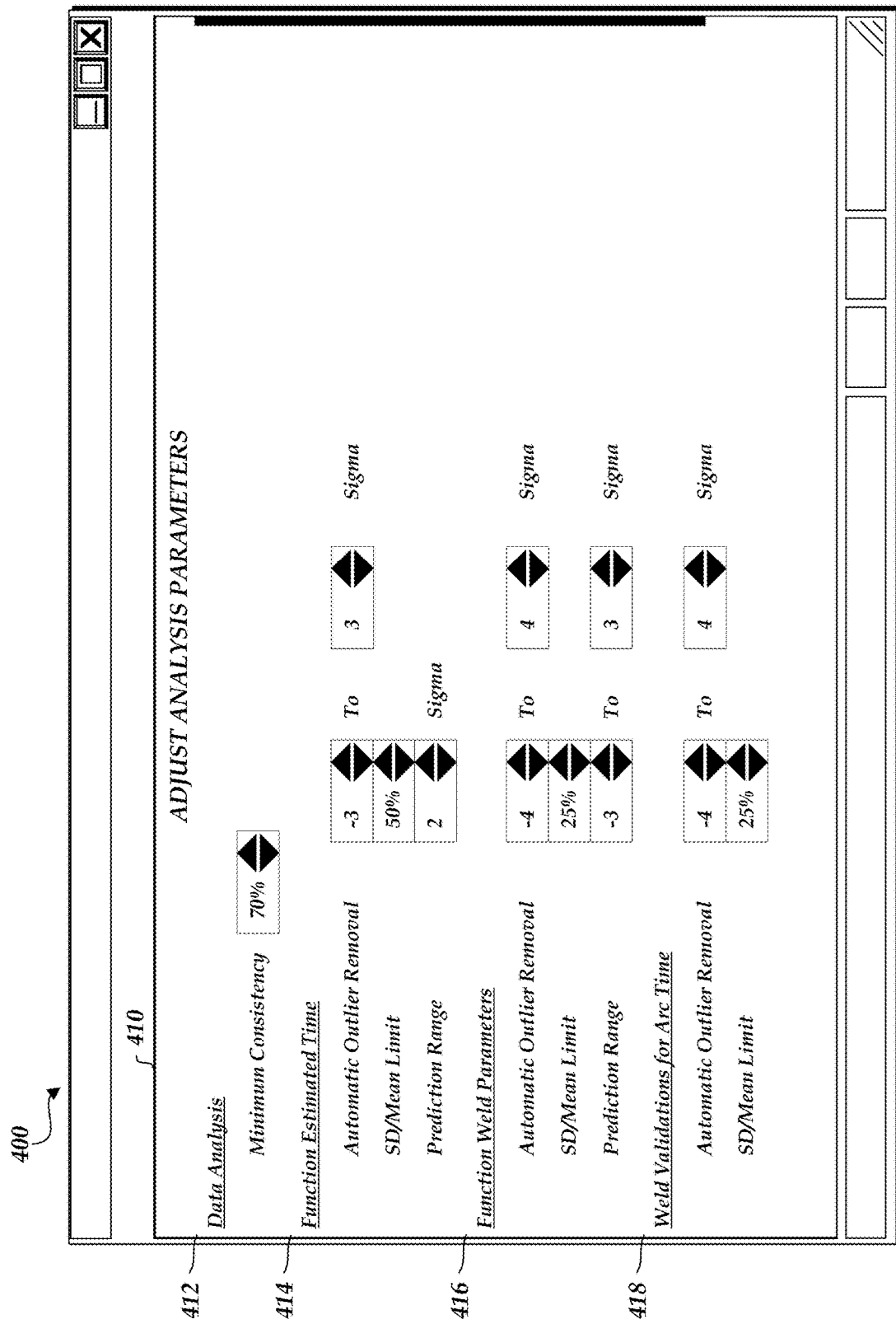
FIGS. 4A-4B illustrate a user interface depicting the selection of analysis parameters.
Figure 4B:
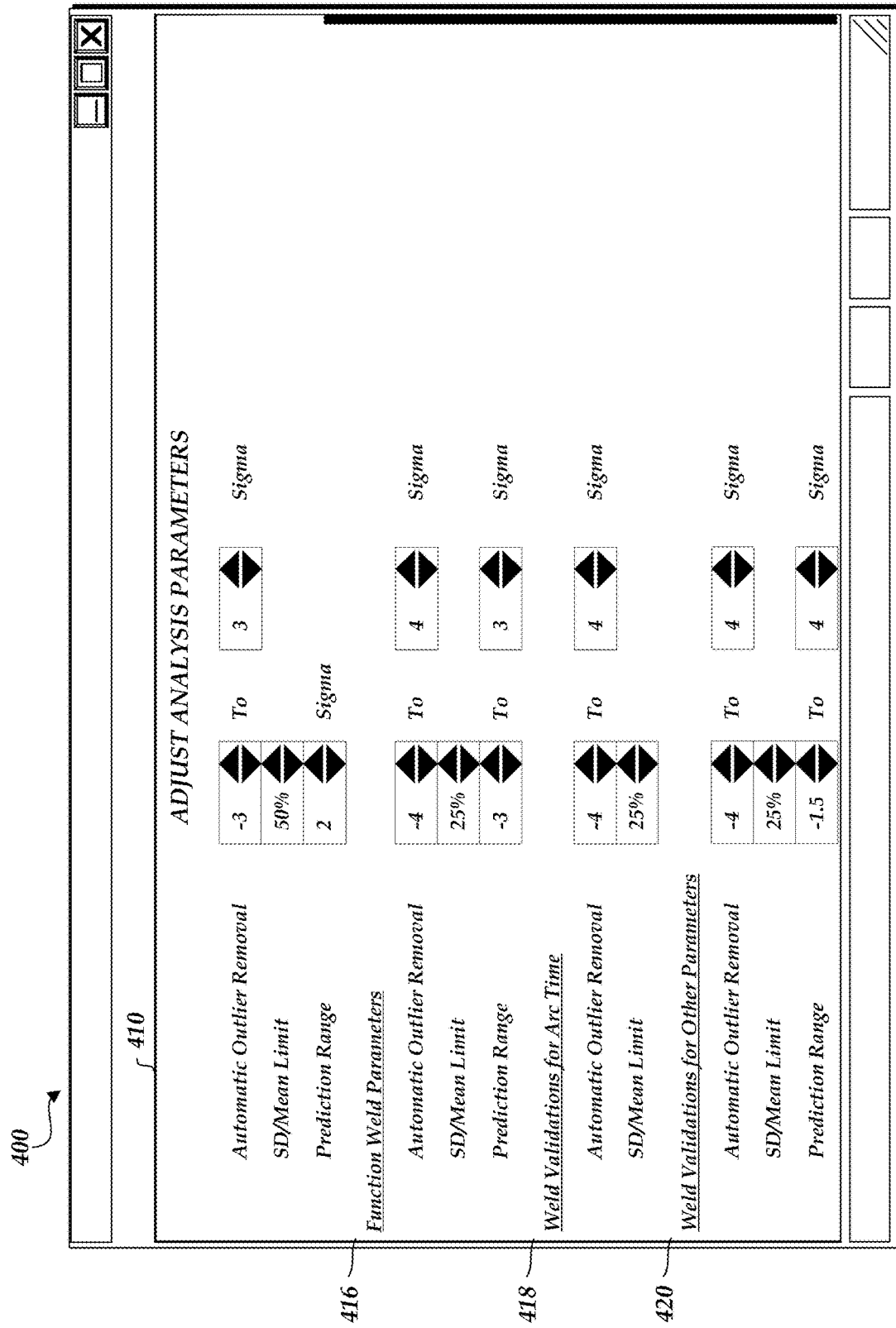

FIGS. 4A-4B illustrate a user interface 400 depicting the selection of analysis parameters. As illustrated in FIGS. 4A-4B, the user interface 400 displays a list of adjustable analysis parameters: data analysis 412, function estimated time 414, function weld parameters 416, weld validations for arc time 418, and weld validations for other parameters 420. Under the data analysis parameter 412, the user or operator can set a minimum consistency percentage. The minimum consistency percentage represents the percentage of repeated report parameter values where the data is consistent. For example, if the percentage is set to 70%, as illustrated in FIG. 4A, then at least 70% of parameter values included in the reports selected in the user interface 200 must be the same value to be automatically included for analysis by the weld validation analyzer 104.

Under the analysis parameters 414, 416, 418, and 420, the user or operator can select analysis parameter values that limit the dataset to data considered valuable by the user or operator. For example, the user or operator can set a low limit and a high limit for an automatic outlier removal field. In an embodiment, the weld validation analyzer 104 loads all data from the selected reports and calculates statistics from the entire dataset. The weld validation analyzer 104 then removes any data points that fall outside the standard deviation limits specified by the low limit and the high limit for the automatic outlier removal field. The low limit and the high limit can be symmetrical, opposite values (e.g., a negative and positive value of the same number, respectively, such as −3 and 3) or asymmetrical, different values (e.g., −1.5 and 3). As another example, the user or operator can set a percentage for a standard deviation (SD)/mean limit field. The SD/mean limit field is the maximum limit for considering the data useful or consistent. If the analysis by the weld validation analyzer 104 produces an SD/mean (e.g., coefficient of variation) value that is less than the specified limit (e.g., 50% here), then the weld validation analyzer 104 automatically selects the data for a next step in the analysis. As another example, the user or operator can set a range for a prediction range field. The weld validation analyzer 104 can use the specified range to provide a buffer on either end of an average value of a weld parameter. The range can either be a single value or a low limit and a high limit. The low limit and the high limit can be symmetrical, opposite values (e.g., a negative and positive value of the same number, respectively, such as −3 and 3) or asymmetrical, different values (e.g., −1.5 and 3). How the weld validation analyzer 104 uses the range is described in greater detail below with respect to FIG. 6.

The weld validation analyzer 104 can use the values selected for the function estimated time analysis parameter 414 to limit the dataset to data considered valuable when calculating the estimated time for each function in the sequence file. The weld validation analyzer 104 can calculate the estimated time for at least one or more of the following functions: display HTML, display picture, field entry, review, weld, weld accumulator, weld open, PLC field entry, PLC tag read, or PLC tag write.

The weld validation analyzer 104 can use the values selected for the function weld parameters analysis parameter 416 to limit the dataset to data considered valuable when calculating the weld parameters for each function in the sequence file. The weld validation analyzer 104 can calculate the weld parameters for at least one or more of the following functions: weld accumulator (e.g., minimum number of welds and accurate minimum/maximum values) or weld open (e.g., minimum number of welds and maximum number of welds).

The weld validation analyzer 104 can use the values selected for the weld validations for arc time analysis parameter 418 to limit the dataset to data considered valuable when calculating the arc time values for each function in the sequence file.

The weld validation analyzer 104 can use the values selected for the weld validations for other parameters analysis parameter 420 to limit the dataset to data considered valuable when calculating any remaining weld parameters for each function in the sequence file. The weld validation analyzer 104 further generates the following parameter values based on the functions (and/or report dataset) in the sequence file: arc voltage, arc amperage, wire feed speed, deposition, TRUE ENERGY, and WELDSCORE.

Figure 5:
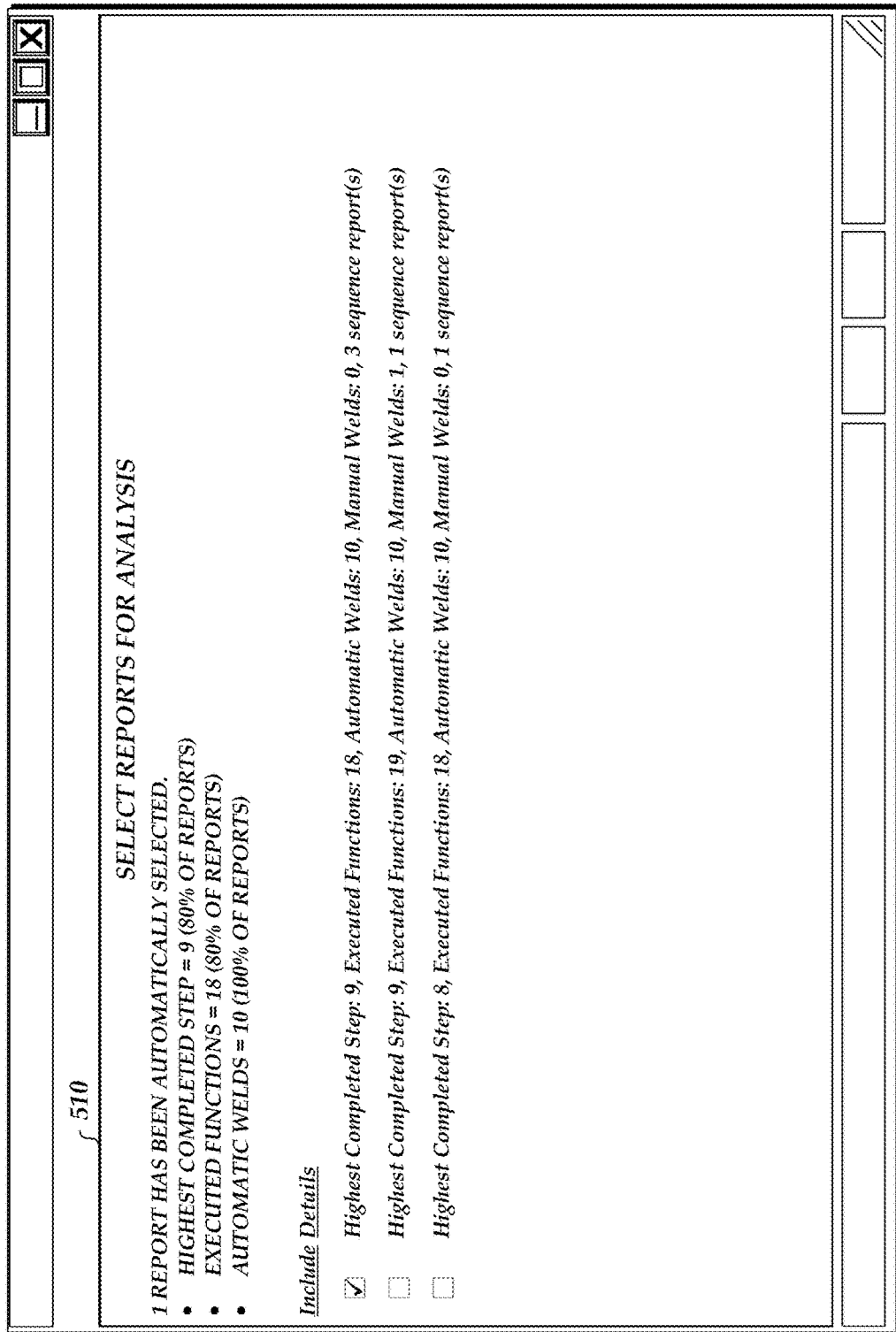
FIG. 5 illustrates a user interface depicting the selection of one or more reports for analysis.

FIG. 5 illustrates a user interface 500 depicting the selection of one or more reports for analysis. As illustrated in FIG. 5, before completing an analysis based on the selected values of the analysis parameters 412, 414, 416, 418, and/or 420, the weld validation analyzer 104 groups together similar reports and automatically selects the reports that fall above the specified minimum consistency percentage for the following items: highest completed step, executed functions, and automatic welds.

Highest completed step is the highest step number completed in the sequence file. As depicted in window 510, the user interface 500 displays the percentage of reports (e.g., 80%) that reached the highest completed step (e.g., 9). Executed functions is the number of functions that were performed in the sequence file. As depicted in the window 510, the user interface 500 displays the percentage of reports (e.g., 80%) that reached the number of performed functions (e.g., 18). Automatic welds is the number of welds performed when in automatic mode in the sequence file. As depicted in the window 510, the user interface 500 displays the percentage of reports (e.g., 100%) that reached the number of performed welds (e.g., 10).

The user interface 500 can automatically select the report or reports that meet the minimum consistency percentage for the three items described above. For example, the window 510 displays details for five reports. Three reports are grouped together (e.g., because they each have a highest completed step of 9, executed functions of 18, and automatic welds of 10) and two reports are placed in groups in which they are the only reports (e.g., because they don't share values for the three items with any other report). The group with three reports is automatically selected because the values for all three items meet the minimum consistency percentage of 70%, as illustrated in FIG. 4A. The other two groups are not selected because one or more of the values of the three items do not meet the minimum consistency percentage of 70% (e.g., because at least 70% of reports do not share values for one or more of the three items). However, the user or operator can select a group to include in the analysis even if the group does not meet the minimum consistency percentage.

FIG. 6 illustrates a user interface 600 depicting the selection of weld parameter limits to include in a sequence file. In an embodiment, once the groups are selected, the weld validation analyzer 104 performs a statistical analysis of the weld data in the selected reports. For example, the weld validation analyzer 104 removes any data points that fall outside the standard deviation limits specified by the values associated with the automatic outlier removal fields. Next, the weld validation analyzer 104 uses the specified SD/mean values to determine if the remaining data points are consistent. If the remaining data points are consistent, then the weld validation analyzer 104 uses the ranges specified in the prediction range fields to determine minimum and/or maximum weld parameter limits for one or more functions. As described above, the weld validation analyzer 104 can use this process to determine specific minimum and/or maximum weld parameters limits for each individual function (e.g., by analyzing weld data associated with the unique identifier of the respective function and determining the minimum and/or maximum weld parameter limits using this specific weld data along with the specified ranges).

The user interface 600 displays the results of the statistical analysis performed by the weld validation analyzer 104. For example, window 610 in the user interface 600 displays a table 612 and a table 614. The table 612 can list function data and allow the user or operator to select function data to be included in the sequence file. In an embodiment, the user interface 600 automatically selects function data that meets the SD/mean limit percentage (e.g., falls below the SD/mean percentage). However, the user or operator can select function data for inclusion in the sequence file even if the function data does not meet the SD/mean limit percentage. The table 614 can list data associated with weld validations (e.g., weld validation limits) and allow the user or operator to select weld validations to be included in the sequence file. In an embodiment, the user interface 600 automatically selects weld validations that meet the SD/mean limit percentage (e.g., falls below the SD/mean percentage). However, the user or operator can select weld validations for inclusion in the sequence file even if the weld validations do not meet the SD/mean limit percentage.

In the table 612, each row is associated with a different function in the sequence file. The step column identifies the step number in the sequence file, the function type column identifies the type of function from which the corresponding data was collected (e.g., a welding function), the function name column identifies the given name of the function, and the parameter column identifies the data represented by the row (e.g., estimated time, minimum number of welds, etc.).

The value in the low limit column (if any) is based on the values in the average and SD columns, which are calculated from the selected reports, taking into account the selected prediction ranges. For example, the weld validation analyzer 104 can calculate the low limit value by multiplying the SD value by the low limit of the prediction range specified for the type of parameter specified in the parameter column, and adding the value in the average column to the result of the multiplication. If only a single range value is provided for the prediction range, then a low limit may not be calculated. In the table 612, no low limit values are displayed because the estimated time parameter is only associated with a single range value (e.g., see FIG. 4A). In an embodiment, the average and SD values for a step are calculated using weld data of a same type included in the selected reports that were obtained during the performance of the step (with the unique identifier of the function/step linking the step and weld data). Thus, the low limit value in a row can be specific to the step of the row (and can be different for two or more steps even if the steps are each associated with the same type of function).

The value in the high limit column (if any) is based on the values in the average and SD columns, which are calculated from the selected reports, taking into account the selected prediction ranges. For example, the weld validation analyzer 104 can calculate the high limit value by multiplying the SD value by the high limit of the prediction range specified for the type of parameter specified in the parameter column, and adding the value in the average column to the result of the multiplication. If only a single range value is provided for the prediction range, then the high limit may be calculated based on this single range value. In the table 612, the high limit values are based on the single range value associated with the estimated time parameter (e.g., see FIG. 4A). As described above, the average and SD values for a step are calculated using weld data of a same type included in the selected reports that were obtained during the performance of the step. Thus, the high limit value in a row can be specific to the step of the row (and can be different for two or more steps even if the steps are each associated with the same type of function).

The samples column identifies a number of data points that were used to determine the low and/or high limit values. If the weld validation analyzer 104 discovers an outlier during the statistical analysis, the column indicates that. For example, if the sample column displays 3 of 4, then this means that one of the data points was removed due to the inconsistency of the data (e.g., due to the data point not meeting the low limits and/or high limits of the automatic outlier removal fields). The comments column includes any relevant notes, such as a reason why a row is not automatically selected.

In the table 614, multiple rows can be associated with a same function in the sequence file. The step, function type, function name, low limit, high limit, samples, average, SD, and comments columns can be the same as in the table 612. The weld validation column indicates the calculated weld validation parameter associated with the row (e.g., arc time, arc voltage, arc amperage, wire feed speed, deposition, TRUE ENERGY, WELDSCORE, etc.). If selected, this can be a property that the welding job sequencer 102 can use in determining whether a weld is valid or invalid.

Example Process Flow

Figure 7:
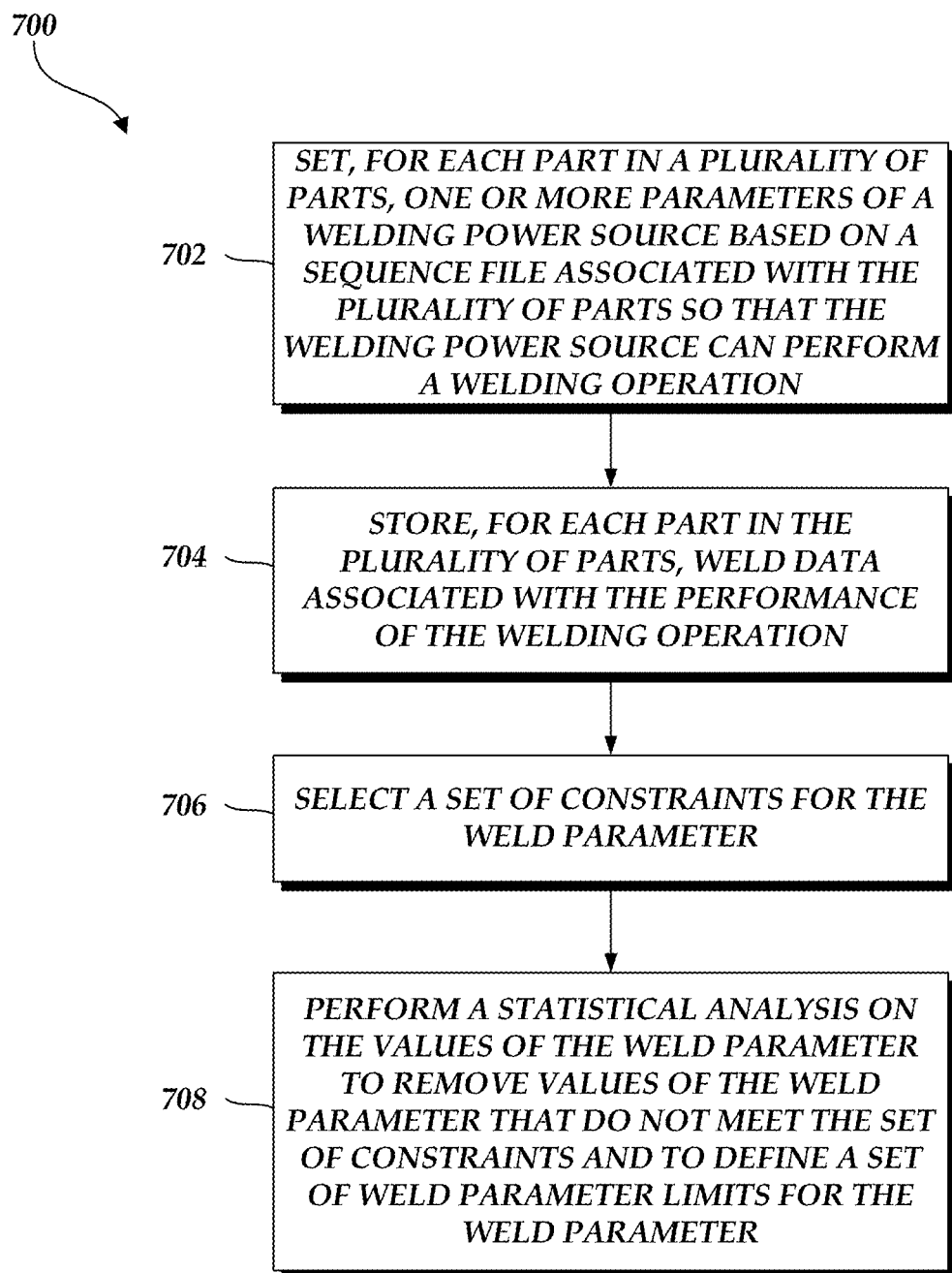
FIG. 7 is a flowchart depicting an illustrative operation of analyzing weld operations and determining a set of weld parameter limits.

FIG. 7 is a flowchart 700 depicting an illustrative operation of analyzing weld operations and determining a set of weld parameter limits. Depending on the embodiment, the method of FIG. 7 may be performed by various computing devices, such as by the welding job sequencer 102 (e.g., the weld validation analyzer 104). Depending on the embodiment, the method of FIG. 7 may include fewer and/or additional blocks and the blocks may be performed in an order different than illustrated.

In block 702, for each part in a plurality of parts, one or more parameters of a welding power source are set based on a sequence file associated with the plurality of parts so that the welding power source can perform a welding operation. For example, the sequence file can include a sequence of functions, and each function can define one or more parameters for the welding power source.

In block 704, for each part in the plurality of parts, weld data associated with the performance of the welding operation is stored. For example, the weld data can be stored in reports. The weld data can include data for a weld parameter.

In block 706, a set of constraints for the weld parameter are selected. For example, the set of constraints can be values for the fields of the analysis parameters 412, 414, 416, 418, and/or 420. The set of constraints can be selected after one or more reports are selected and a specific type of part is identified for analysis.

In block 708, a statistical analysis is performed on the values of the weld parameter to remove values of the weld parameter that do not meet the set of constraints and to define a set of weld parameter limits for the weld parameter. For example, the set of weld parameter limits can be the low limit values and/or the high limit values determined for each step in the sequence file, as illustrated in FIG. 6.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

What is claimed is:

1. A method of analyzing welding operations, the method comprising:

storing, for each part in a plurality of parts, weld data associated with the performance of a welding operation by a welding power source, wherein the weld data comprises a value for a weld parameter;

retrieving a sequence file associated with the plurality of parts, retrieving the weld data for each part in the plurality of parts;

receiving an operator selection of a set of constraints for the weld parameter, wherein the set of constraints comprises a number of standard deviations below a mean weld parameter value and a number of standard deviations above the mean weld parameter value;

removing values of the weld parameter that are below a value corresponding to the number of standard deviations below the mean weld parameter value or that are above a value corresponding to the number of standard deviations above the mean weld parameter value; and subsequently performing a statistical analysis on remaining values of the weld parameter to define a set of weld parameter limits for the weld parameter.

2. The method of claim 1, further comprising setting, for each part in the plurality of parts, one or more parameters of the welding power source based on the sequence file associated with the plurality of parts.

3. The method of claim 1, further comprising automatically modifying the sequence file associated with the plurality of parts to include the set of weld parameter limits in response to performing the statistical analysis.

4. The method of claim 3, wherein the sequence file comprises a first function corresponding to the welding operation and a second function corresponding to a second welding operation, and wherein the first function is associated with a first identifier and the second function is associated with a second identifier.

5. The method of claim 4, wherein the weld data for each part in the plurality of parts is associated with the first identifier, and wherein automatically modifying the sequence file further comprises:

identifying that the first function is associated with the first identifier; and automatically modifying the first function in the sequence file to include the set of weld parameter limits based on the identification.

6. The method of claim 3, wherein the sequence file comprises at least one of a welding schedule, a portion of a welding schedule, a step-by-step instruction, a portion of media, or a tutorial.

7. The method of claim 4, wherein the first function and the second function correspond to welding operations that are not performed sequentially.

8. The method of claim 7, wherein the first function and the second function correspond to welding operations performed as part of a nested welding sequence.

9. The method of claim 1, wherein the set of constraints further comprises a first coefficient of variation, and wherein the method further comprises generating an alert when the remaining values of the weld parameter result in a coefficient of variation greater than the first coefficient of variation.

10. The method of claim 9, wherein the set of constraints further comprises a second number of standard deviations below the mean weld parameter value and a third number of standard deviations above the mean weld parameter value, and wherein the method further comprises defining the set of weld parameter limits for the weld parameter based on a mean of the remaining values of the weld parameter, the second number of standard deviations below the mean weld parameter value, and the third number of standard deviations above the mean weld parameter value.

11. The method of claim 1, wherein the weld parameter includes at least one of a current level, a voltage level, a wire feed speed, a weld time, and a weld operation total time.

12. The method of claim 1, further comprising determining a user input.

13. The method of claim 12, wherein the user input comprises information associated with the set of weld parameter limits.

14. The method of claim 12, wherein the user input comprises information associated with the set of constraints.

15. The method of claim 12, further comprising modifying the sequence file based on the user input.

16. The method of claim 12, further comprising determining a part selection based on the user input and causing a display of weld data based on the part selection.

* * * * *